United States Patent
Kotowski

(10) Patent No.: US 9,310,941 B2
(45) Date of Patent: Apr. 12, 2016

(54) TOUCH SENSOR INPUT TOOL WITH OFFSET BETWEEN TOUCH ICON AND INPUT ICON

(75) Inventor: Jeff Kotowski, Nevada City, CA (US)

(73) Assignee: Atmel Corporation, San Jose, CA (US)

( * ) Notice: Subject to any disclaimer, the term of this patent is extended or adjusted under 35 U.S.C. 154(b) by 626 days.

(21) Appl. No.: 13/252,533

(22) Filed: Oct. 4, 2011

(65) Prior Publication Data

US 2013/0086503 A1 Apr. 4, 2013

(51) Int. Cl.
*G06F 17/00* (2006.01)
*G06F 3/044* (2006.01)
*G06F 3/0488* (2013.01)

(52) U.S. Cl.
CPC .......... *G06F 3/044* (2013.01); *G06F 3/04886* (2013.01)

(58) Field of Classification Search
CPC ..... G06F 3/04812; G06F 3/048; G06F 3/044; G06F 3/04886
USPC .................................. 715/773, 840; 345/173
See application file for complete search history.

(56) References Cited

U.S. PATENT DOCUMENTS

| | | | |
|---|---|---|---|
| 7,577,925 B2 * | 8/2009 | Zotov et al. ................... | 715/863 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,446,376 B2 * | 5/2013 | Levy et al. .................... | 345/173 |
| 8,495,493 B2 * | 7/2013 | Ha et al. ........................ | 715/702 |
| 2005/0169527 A1 * | 8/2005 | Longe et al. .................. | 382/177 |
| 2006/0227116 A1 * | 10/2006 | Zotov et al. ................... | 345/173 |
| 2007/0040813 A1 * | 2/2007 | Kushler et al. ................ | 345/173 |
| 2007/0152980 A1 * | 7/2007 | Kocienda et al. ............. | 345/173 |
| 2008/0163119 A1 * | 7/2008 | Kim et al. ..................... | 715/840 |
| 2008/0309635 A1 | 12/2008 | Matsuo | |
| 2009/0002326 A1 * | 1/2009 | Pihlaja ........................... | 345/173 |
| 2009/0048000 A1 * | 2/2009 | Ade-Hall ....................... | 455/566 |
| 2009/0315854 A1 | 12/2009 | Matsuo | |
| 2010/0156813 A1 * | 6/2010 | Duarte et al. .................. | 345/173 |
| 2010/0283744 A1 * | 11/2010 | Nordenhake et al. ......... | 345/173 |

(Continued)

FOREIGN PATENT DOCUMENTS

WO WO 2012/129247 9/2012

OTHER PUBLICATIONS

U.S. Appl. No. 61/454,936, filed Mar. 21, 2011, Myers.

(Continued)

*Primary Examiner* — Stephen Hong
*Assistant Examiner* — Marshon Robinson
(74) *Attorney, Agent, or Firm* — Baker Botts L.L.P.

(57) ABSTRACT

In one embodiment, a method includes displaying an input tool comprising a first touch icon and a first input icon. The first touch icon may be visually separated from the first input icon by a predetermined distance. The first input icon may provide a graphical indication of an input associated with the first touch icon. The method may include determining an input based on a touch at or substantially near a location on a touch sensor associated with the first touch icon. The method may also include effecting the input as determined.

22 Claims, 5 Drawing Sheets

(56) References Cited

U.S. PATENT DOCUMENTS

| | | | |
|---|---|---|---|
| 2010/0328209 A1* | 12/2010 | Nakao | 345/157 |
| 2011/0035665 A1* | 2/2011 | Kim et al. | 715/702 |
| 2011/0107209 A1* | 5/2011 | Ha et al. | 715/702 |
| 2011/0219330 A1* | 9/2011 | Ando et al. | 715/784 |
| 2011/0261030 A1* | 10/2011 | Bullock | 345/204 |
| 2012/0019528 A1* | 1/2012 | Ugawa et al. | 345/419 |
| 2012/0044173 A1* | 2/2012 | Homma et al. | 345/173 |
| 2012/0084692 A1* | 4/2012 | Bae | 715/769 |
| 2012/0162093 A1* | 6/2012 | Buxton et al. | 345/173 |
| 2012/0192114 A1* | 7/2012 | DeLuca | 715/848 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2013/0078990 A1* | 3/2013 | Kim et al. | 455/422.1 |
| 2013/0198684 A1* | 8/2013 | Boley et al. | 715/788 |
| 2013/0307796 A1* | 11/2013 | Liu et al. | 345/173 |
| 2013/0314316 A1* | 11/2013 | Kolmykov-Zotov et al. | 345/157 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

TOUCH SENSOR INPUT TOOL WITH OFFSET BETWEEN TOUCH ICON AND INPUT ICON

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
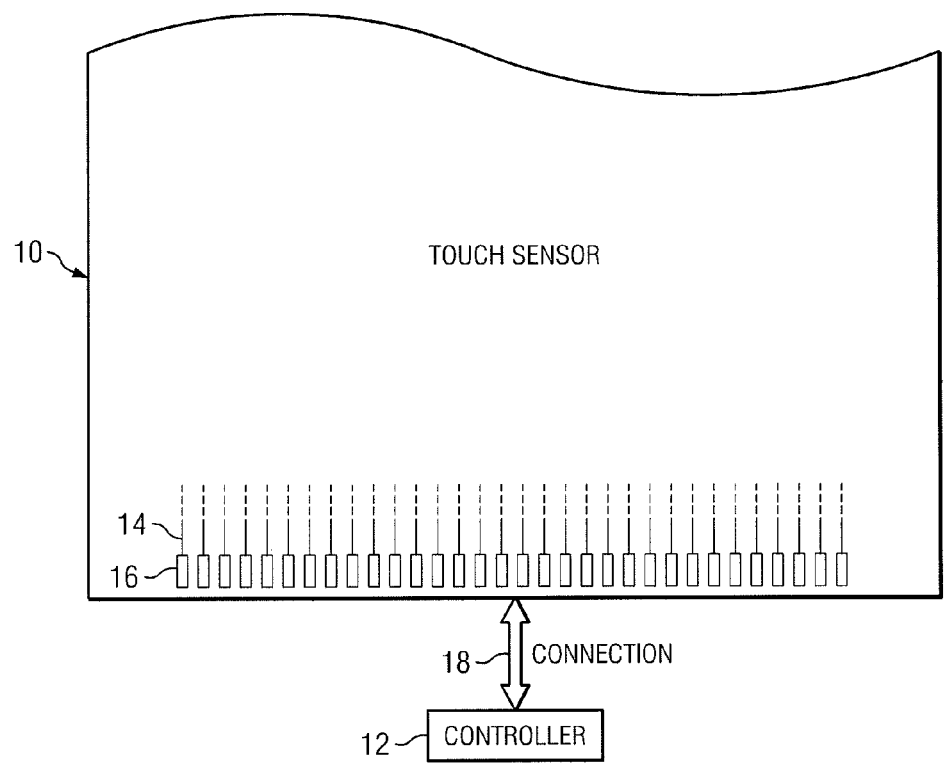
FIG. 1 illustrates an example touch sensor with an example controller.

FIG. 1 illustrates an example touch sensor 10 with an example controller 12. Touch sensor 10 and controller 12 may be part of a device (e.g. device 20 of FIGS. 2-4), such as a smartphone, a PDA, a tablet computer, a laptop computer, a desktop computer, a kiosk computer, a satellite navigation device, a portable media player, a portable game console, a point-of-sale device, another suitable device, a suitable combination of two or more of these, or a suitable portion of one or more of these. Herein, reference to a touch sensor may encompass a touch screen, and vice versa, where appropriate. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas, where appropriate. Touch sensor 10 may include an array of drive and sense electrodes (or an array of electrodes of a single type (e.g. drive)) disposed on a substrate, which may be a dielectric material.

An electrode (whether a drive electrode or a sense electrode) may be an area of conductive material forming a shape, such as for example a disc, square, rectangle, other suitable shape, or suitable combination of these. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy approximately 50% of the area of its shape. As an example and not by way of limitation, an electrode may be made of ITO and the ITO of the electrode may occupy approximately 50% of the area of its shape in a hatched, mesh, or other suitable pattern. In particular embodiments, the conductive material of an electrode may occupy approximately 5% of the area of its shape. As an example and not by way of limitation, an electrode may be made of fine lines of metal or other conductive material (such as for example copper, silver, or a copper- or silver-based material) and the fine lines of conductive material may occupy approximately 5% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes or the means of electrically isolating or physically separating the shapes from each other) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm (including the conductive material forming the drive or sense electrodes); the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type (e.g. drive) that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have a single-layer configuration, with drive and sense electrodes disposed in a pattern on one side of a substrate. In such a configuration, a pair of drive and sense electrodes capacitively coupled to each other across a space between them may form a capacitive node. In a single-layer configuration for a self-capacitance implementation, electrodes of only a single type (e.g. drive) may be disposed in a pattern on one side of the substrate. As an alternative to a single-layer configuration, touch sensor 10 may have a two-layer configuration, with drive electrodes disposed in a pattern on one side of a substrate and sense electrodes disposed in a pattern on another side of the substrate. In such a configuration, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across the substrate at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices or arrays, application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to bond pads 16, also disposed on the substrate of touch sensor 10. As described below, bond pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector at an edge of the substrate of touch sensor 10 (similar to tracks 14).

Bond pads 16 may be located along one or more edges of the substrate, outside the touch-sensitive area(s) of touch sensor 10. As described above, controller 12 may be on an FPC. Bond pads 16 may be made of the same material as tracks 14 and may be bonded to the FPC using an anisotropic conductive film (ACF). Connection 18 may include conductive lines on the FPC coupling controller 12 to bond pads 16, in turn coupling controller 12 to tracks 14 and to the drive or sense electrodes of touch sensor 10. This disclosure contemplates any suitable connection 18 between controller 12 and touch sensor 10.

In a particular embodiment, touch sensor 10 may overlay a display that displays a touch sensor input tool. Input associated with the touch sensor input tool may be entered when a touch or proximity input is detected at a point of touch sensor 10 that is associated with the touch sensor input tool (e.g. at a point of touch sensor 10 that overlays the display of the touch sensor input tool). A typical touch sensor input tool implemented by a typical touch sensor may facilitate the entry of input by providing a graphical indication of the input that will be recorded when a touch or proximity input associated with the touch sensor input tool is detected. However, in typical touch sensor input tools, an object used to touch the touch sensor 10 at a point overlaying the touch sensor input tool may block the view of all or a portion of the touch sensor input tool (e.g. the graphical indication of the input). Accordingly, it may be difficult for a user to accurately or quickly enter input using the touch sensor input tool.

Particular embodiments of the present disclosure may provide one or more or none of the following technical advantages. In particular embodiments, a touch sensor input tool may be provided. By way of example and not limitation, a touch sensor input tool may be a virtual keyboard (or a portion thereof), a fixed display keyboard, or a virtual drawing tool. The touch sensor input tool may include a touch icon and an input icon. The touch icon may be separated from the input icon by a predetermined offset distance. The input icon may provide a graphical indication of an input associated with the touch icon. For example, the input icon may provide a graphical indication of input that will be entered when a touch or proximate input is detected at a portion of touch screen 10 that overlays the touch icon of the touch sensor input tool. In a particular embodiment, the graphical indication of input provided by the input icon of the touch sensor input tool is not blocked from view of a user, even when an object is in contact with the portion of the touch screen that overlays the touch icon of the touch sensor input tool. Particular embodiments may provide for faster and more accurate data input.

Figure 2:
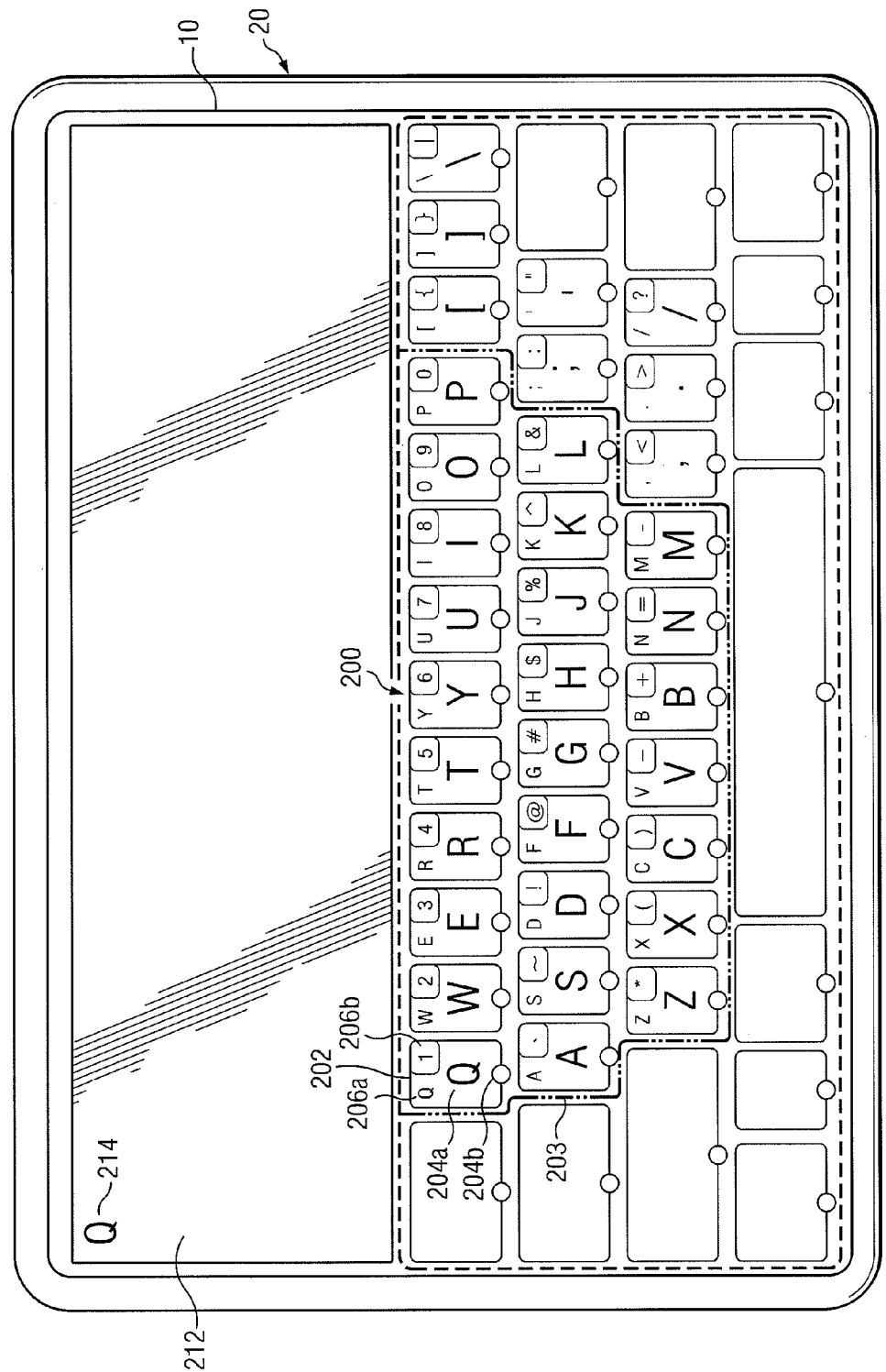
FIG. 2 illustrates an example virtual keyboard that may be implemented by a device that includes a touch sensor.

FIG. 2 illustrates an example virtual keyboard 200 that may be implemented by a device 20 that includes a touch sensor 10. Virtual keyboard 200 may provide a means for a user to enter input, such as text or other data. In particular embodiments, virtual keyboard 200 may include functions that are similar to the functions of a physical keyboard. For example, when a virtual key 202 of the virtual keyboard 200 is touched, input associated with virtual key 202 may be entered.

In particular embodiments, virtual keyboard 200 may be displayed by a display coupled to touch sensor 10. By way of example and not limitation, touch sensor 10 may overlay virtual keyboard 200 (i.e., may overlay the display that displays virtual keyboard 200). In particular embodiments, a fixed display keyboard may be implemented on a fixed touch screen or a portion of a touch screen that is fixed (e.g. an area of a touch screen that has no display panel or does not change its display). Although the various examples and methods of the present disclosure focus on a virtual keyboard, this disclosure contemplates a fixed display keyboard that may include any of the structure or functionality described with respect to a virtual keyboard.

Virtual keyboard 200 comprises a plurality of virtual keys 202. Each virtual key 202 includes one or more touch icons 204 and one or more input icons 206. A touch icon 204 or an input icon 206 may be any suitable graphical representation, such as a symbol, shape, design, or other visual indicator. In particular embodiments, a symbol may include a character, letter, word, number, alphanumeric phrase, punctuation mark, mathematical operator, logical operator, or combination thereof. A touch icon 204 may provide a graphical indication to a user to touch the touch icon 204 in order to enter input (e.g. input associated with the virtual key 202 of the touch icon 204). An input icon 206 may provide a graphical indication of the input that is entered. For example, the input icon 206 may indicate the input that will be entered when an area of touch screen 10 associated with (e.g. overlaying) a touch icon 204 corresponding to the input icon is touched.

In particular embodiments, a touch icon 204 and an input icon 206 of a virtual key 202 may be separated by a predetermined offset distance. As an example, a point on a touch icon 204 (e.g. an outer point or a central point) may be located a predetermined offset distance from a corresponding point on an input icon 206 of the same virtual key 202. Such embodiments may allow input icon 206 to be viewed while the touch icon 204 is being touched by an object. This may lead to enhanced usability of virtual keyboard 200. For example, a user may be able to enter input more quickly or accurately in these embodiments than in typical configurations. In particular embodiments, a touch icon 204 may be offset from a corresponding input icon 206 in any suitable direction. By way of example, input icon 206a of FIG. 2 is placed above and to the left of the corresponding touch icons 204a and 204b and input icon 206b is placed above and to the right of the corresponding touch icons 204a and 204b.

In particular embodiments, a touch icon 204 of virtual key 202 may be the same symbol as an input icon 206 of the virtual key. For example, as depicted, touch icon 204a is the same symbol as input icon 206a. In particular embodiments, input icon 206 may have dimensions that are larger, equal to, or smaller than the dimensions of touch icon 204. In a particular embodiment, input icon 206 is a smaller replica of touch icon 204. For example, as depicted, each virtual key 202 of the virtual keyboard 200 includes a touch icon 204a that is a symbol and an input icon 206a is a smaller version of the symbol.

In particular embodiments, virtual keys 202 of an alphabet section 203 of virtual keyboard 200 each comprise a touch icon 204a and an input icon 206a that are a particular letter of an alphabet. In particular embodiments, the touch icons 204a or input icons 206a of alphabet section 203 of virtual keyboard 200 may collectively comprise an entire alphabet of a language.

In particular embodiments, one or more virtual keys 202 of virtual keyboard 200 may each comprise a touch icon 204b in place of or in addition to touch icon 204a. In the embodiment depicted, each touch icon 204b is a circle. In other embodiments, touch icon 204b may have any suitable shape, color, size, or other characteristic.

In particular embodiments, one or more sensor nodes of touch sensor 10 may be associated with touch icon 204. For example, the sensor nodes associated with touch icon 204 may be one or more sensor nodes that overlay a portion or all of touch icon 204. In particular embodiments, one or more sensor nodes that are within a predetermined distance of the sensor nodes that overlay touch icon 204 may also be associated with touch icon 204. In particular embodiments, controller 12 is operable to detect a touch or proximate input at one or more sensor nodes associated with touch icon 204. As used herein, a detection of a touch or proximate input at a sensor node associated with a touch icon (such as touch icon 204) may be referred to as a touch of the touch icon. A sensor node may be a portion of a touch sensor 10 that is operable to provide a measurement that may be indicative of whether a touch has occurred at the portion. In particular embodiments, a sensor node may be a capacitive node (as described above), a resistive node, or other suitable node.

In particular embodiments, when a sensor node associated with touch icon 204 of virtual key 202 is touched, an input may be determined according to a graphical indication provided by an input icon 206 associated with the touch icon 204 (e.g. an input icon 206 located at the same virtual key 202 as touch icon 204). In particular embodiments, the graphical indication provided by the input icon 206 may be a symbol. In particular embodiments, the symbol determined may be a replica of touch icon 204 or input icon 206. In particular embodiments, the symbol of input icon 206a is determined when virtual keyboard 200 is in a default state, and the symbol of input icon 206b is determined when the virtual keyboard is in an alternate state. In a particular embodiment, the alternate state may be entered or exited by touching a particular virtual key 202. In particular embodiments, after entering the alternate state, virtual keyboard 200 may return to the default state at any suitable time, such as after an input is determined in response to a touch of a virtual key 202.

After the input is determined in response to the touch or proximate input, the input may be entered or otherwise effected. In particular embodiments, entering input may include storing the determined input on a computer readable medium. For example, a representation of a symbol may be stored in a memory of device 20. In particular embodiments, entering input may also include displaying the determined input. For example, the determined input 214 may be displayed in display area 212 of device 20. In particular embodiments, input 214 may be displayed by a display coupled to touch sensor 10.

In particular embodiments, the virtual keyboard 200 may be operated in a standard mode or a continuous input mode. In the standard mode, a symbol may be determined each time a touch icon 204 is touched. In the continuous input mode, one or more symbols are detected according to a pattern an object makes as it moves across touch screen 10. For example, an initial virtual key 202 (corresponding to a first letter of a desired word) may be touched by an object and the object may be held against touch sensor 10 as it is moved to each successive virtual key 202 (corresponding to letters of the desired word) until the object touches the final virtual key 202 (corresponding to the last letter of the desired word). The object is then removed from touch sensor 10. The motion of the object across the various virtual keys 202 may be termed an input pattern. In particular embodiments, the input pattern may be analyzed to determine the intended word. For example, a word that most closely corresponds with the input pattern may be chosen from a database of words. In particular embodiments, a partial response maximum likelihood (PRML) algorithm may be used to select the word. A PRML algorithm may select a word based on a combination of the individual probabilities that the letters of the word were selected as the object moved across touch sensor 10. For example, the word "dog" may be selected based on a 83% chance that "d" was selected, a 49% chance that "o" was selected, and a 72% chance that "g" was selected. The operations described above may be repeated to input additional words or other combinations of symbols.

Figure 3:
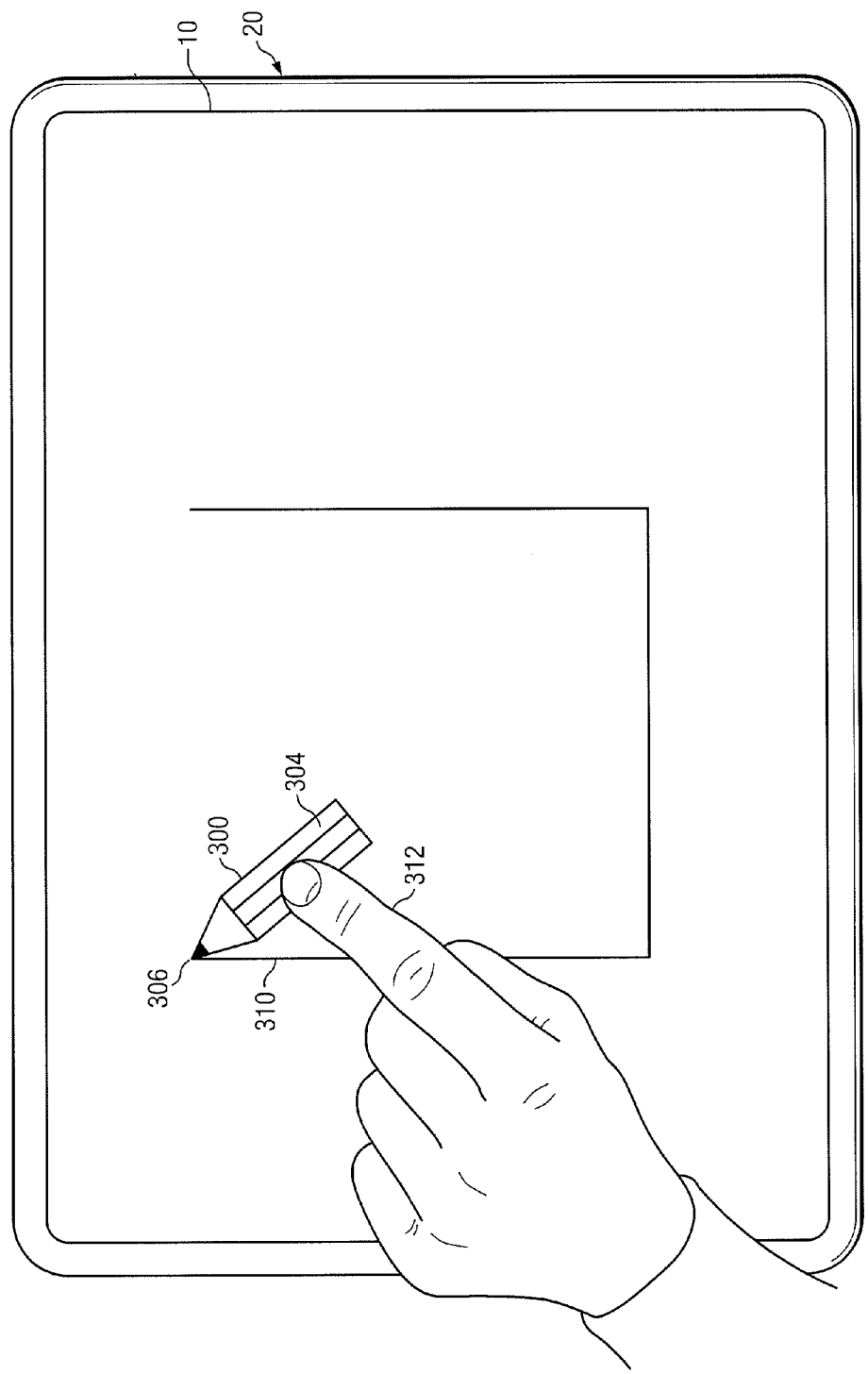
FIG. 3 illustrates an example virtual pencil tool that may be implemented by a device that includes a touch sensor.

FIG. 3 illustrates a virtual pencil tool 300 that may be implemented by a device 20 that includes a touch sensor 10. Virtual pencil tool 300 is a virtual drawing tool that may facilitate the creation of a drawing by device 20. A drawing may include any suitable shape, figure, written text, or other designs.

In particular embodiments, virtual pencil tool 300 may be displayed by a display coupled to touch sensor 10. In particular embodiments, touch sensor 10 may overlay virtual pencil tool 300 (i.e., may overlay the display that displays virtual pencil tool 300). In particular embodiments, virtual pencil tool 300 may include one or more touch icons 304 and one or more input icons 306. A touch icon 304 or input design 306 may be any suitable graphical representation, such as a symbol (as described above), shape, or other visual indicator. By way of example, in the embodiment depicted, virtual pencil tool 300 comprises an input icon 306 that is a tip of a pencil and a touch icon 304 that is a stem of the pencil. Touch icon 304 may provide a graphical indication to a user to touch the touch icon 304 in order to provide input associated with the virtual pencil tool 300. Input icon 306 provides a graphical indication of the input that will be entered when touch icon 304 is touched.

In particular embodiments, a touch icon 304 and an input icon 306 of a virtual pencil tool 300 may be separated by a predetermined offset distance. For example, a point on a touch icon 304 (e.g. an outer point or a central point) may be located a predetermined offset distance from a corresponding point on an input icon 306. Such embodiments may allow input icon 306 to be viewed while the touch icon 304 is being touched by an object 312. This may lead to enhanced usability of virtual pencil tool 300. For example, a user may be able to enter input more quickly or accurately in these embodiments than in typical configurations. In particular embodiments, the predetermined distance between touch icon 304 and input icon 306 may be adjustable. For example, the predetermined distance may be based on the location of an initial touch of touch sensor 10 by a user.

In particular embodiments, a touch icon 304 may be offset from a corresponding input icon 306 in any suitable direction. By way of example, the input icon 306 of FIG. 3 is placed above and to the left of the corresponding touch icon 304. In particular embodiments, the direction or magnitude of the offset between touch icon 304 and input icon 306 may be configurable to facilitate the entry of input. For example, the orientation of virtual pencil tool 300 may be configurable by a user. In particular embodiments, the orientation of virtual pencil tool 300 may automatically change based on the location of virtual pencil tool 300 with respect to touch screen 10. For example, if virtual pencil tool 300 is displayed near the left side of touch screen 10, an orientation similar to that shown in FIG. 3 may be used, but if virtual pencil tool 300 is moved towards the right side of touch screen 10, the input icon 306 of virtual pencil tool 300 may be rotated so that it is located to the right of touch icon 304. Similarly, the orientation of virtual pencil tool 300 may change based on its location with respect to the top or bottom of touch screen 10. In particular embodiments, one or more sensor nodes of touch sensor 10 may be associated with touch icon 304. For example, one or more sensor nodes that overlay a portion or all of touch icon 304. In particular embodiments, one or more sensor nodes that are within a predetermined distance of the sensor nodes that overlay touch icon 304 may also be associated with touch icon 304. In particular embodiments, controller 12 is operable to detect a touch or proximate input at the one or more sensor nodes associated with touch icon 204.

In particular embodiments, when a sensor node associated with touch icon 304 of virtual pencil tool 300 is touched, an input may be determined according to a graphical indication provided by input icon 306. In particular embodiments, the input may be determined according to a location indicated by the input icon 306. For example, in the embodiment depicted, the input may be associated with a location corresponding to the location of the pencil tip of input icon 306 of the virtual pencil tool 300. In other embodiments, the input may be associated with a location that is a predetermined distance in a predetermined direction from the location of input icon 306. In particular embodiments, the distance between the location of a detected touch and the location of entered input may be variable. In particular embodiments, this distance may be based on the location of a detected touch and the location of input icon 306. For example, substantially similar input (e.g., input at a location indicated by input icon 306) may be entered or otherwise effected in response to the detection of a touch at or substantially near any of multiple distinct locations associated with touch icon 306. The input may be any suitable input. As an example, the input may be a drawing unit, such as a mark or an erasure of a mark.

After the input is determined in response to the touch or proximate input, the input may be entered or otherwise effected. In particular embodiments, entering input may include storing the determined input on a computer readable medium. For example, a representation of a drawing mark may be stored in a memory of device 20. In particular embodiments, entering input may also include displaying the determined input. In particular embodiments, the input may be displayed at a location indicated by the input icon 306. For example, a drawing unit may be displayed at a location indicated by (e.g. the pencil tip of) input icon 306. In particular embodiments, the determined input may be displayed by a display of device 20.

In particular embodiments, if the object 312 in contact with the touch icon 304 moves while maintaining contact with touch sensor 10 at one or more sensor nodes associated with touch icon 304, the virtual pencil tool 300 moves according to the movement of the object 312. For example, the virtual pencil tool 300 may move in the same direction as the movement of the object. As another example, the virtual pencil tool 300 may move a distance that is equivalent to or at least based on the distance that the object 312 moves. In particular embodiments, as virtual pencil tool 300 moves from one location to another, input may be determined and entered each time a touch is detected at a distinct sensor node associated with touch icon 304. In particular embodiments, as virtual pencil tool 300 moves to a new location, a new set of sensor nodes may be associated with touch icon 304. For example, this set may include the sensor nodes that overlay the display of the touch icon 304 at its new location.

As depicted in FIG. 3, three lines 310 have been drawn by virtual pencil tool 300 based on the movement of an object 312 that maintains contact with touch sensor 10 at one or more sensor nodes associated with touch icon 304.

In particular embodiments, if object 312 loses contact with the touch sensor 10, the virtual pencil tool 300 may remain at the location at which the last touch was sensed. In particular embodiments, if object 312 contacts touch sensor 10 at a point outside of the touch icon 306 (or a point that is a sufficient distance from touch icon 306), the virtual pencil tool 300 may be moved to or near the point the object 312 made contact with touch sensor 10 (but no input is entered). In another embodiment, virtual pencil tool 300 may be moved by contacting the touch screen 10 with object 312 near the touch icon 306 and then moving the object 312 in the desired direction while maintaining contact between the object 312 and the touch screen 10.

Figure 4:
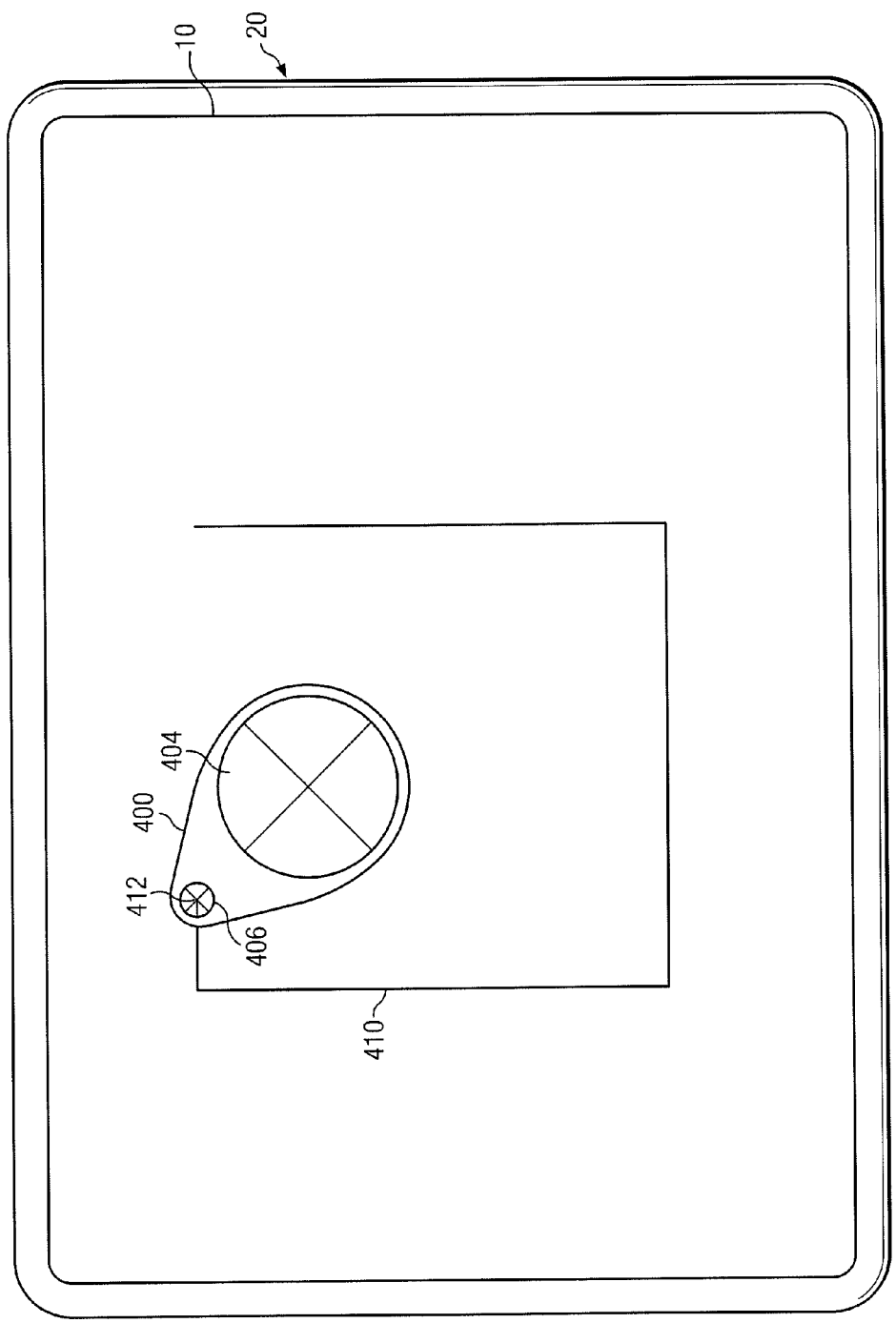
FIG. 4 illustrates an example virtual alignment tool that may be implemented by a device that includes a touch sensor.

FIG. 4 illustrates a virtual alignment tool 400 that may be implemented by a device 20 that includes a touch sensor 10. Virtual alignment tool 400 is a virtual drawing tool that may facilitate the creation of a drawing on device 20. A drawing may include any suitable shape, figure, written text, or other designs. Virtual alignment tool 400 may include some or all of the functionality described in connection with virtual pencil tool 300.

In particular embodiments, virtual alignment tool 400 may be displayed by a display coupled to touch sensor 10. In particular embodiments, touch sensor 10 may overlay virtual alignment tool 400 (i.e., may overlay the display that displays virtual alignment tool 400). In particular embodiments, virtual alignment tool 400 may include one or more touch icons 404 and one or more input icons 406. Touch icon 404 or input icon 406 may be any suitable graphical representation, such as a symbol (as described above), shape, design, or other visual indicator. In particular embodiments, touch icon 404 may be the same design as input icon 406 of the virtual alignment tool 400. By way of example, in the embodiment depicted, virtual alignment tool 400 comprises an input icon 406 that is a crosshair and a touch icon 404 that is also a crosshair. In particular embodiments, input icon 406 may have dimensions that are larger, equal to, or smaller than the dimensions of touch icon 404. In a particular embodiment, input icon 406 is a smaller replica of touch icon 404.

Touch icon 404 may provide a graphical indication to a user to touch the touch icon 404 in order to provide input associated with the virtual alignment tool 400. Input icon 406 may provide a graphical indication of the input that will be entered when touch icon 304 is touched.

In particular embodiments, a touch icon 404 and an input icon 406 of a virtual alignment tool 400 may be separated by a predetermined offset distance. For example, a point on a touch icon 404 (e.g. an outer point or a central point) may be located a predetermined offset distance from a corresponding point on an input icon 406. Such embodiments may allow input icon 406 to be viewed while the touch icon 404 is being touched by an object. This may lead to enhanced usability of virtual alignment tool 400. For example, a user may be able to enter input more quickly or accurately in these embodiments than in typical configurations. In particular embodiments, the predetermined distance between touch icon 404 and input icon 406 may be adjustable. For example, the predetermined distance may be based on the location of an initial touch of touch sensor 10 by a user.

In particular embodiments, a touch icon 404 may be offset from a corresponding input icon 406 in any suitable direction. By way of example, the input icon 406 of FIG. 4 is placed above and to the left of the corresponding touch icon 404. In particular embodiments, the direction or magnitude of the offset between touch icon 404 and input icon 406 may be configurable to facilitate the entry of input. For example, the orientation of virtual alignment tool 400 may be configurable by a user. In particular embodiments, the orientation of virtual alignment tool 400 may automatically change based on the location of virtual alignment tool 400 with respect to touch screen 10. For example, if virtual alignment tool 400 is displayed near the left side of touch screen 10, an orientation similar to that shown in FIG. 4 may be used, but if virtual alignment tool 400 is moved towards the right side of touch screen 10, the input icon 406 of virtual alignment tool 400 may be rotated so that it is located to the right of touch icon 404. Similarly, the orientation of virtual alignment tool 400 may change based on its location with respect to the top or bottom of touch screen 10.

In particular embodiments, one or more sensor nodes of touch sensor 10 may be associated with touch icon 404. For example, one or more sensor nodes that overlay a portion or all of touch icon 404 may be associated with touch icon 404. In particular embodiments, one or more sensor nodes that are within a particular distance of the sensor nodes that overlay touch icon 404 may also be associated with touch icon 404. In particular embodiments, controller 12 is operable to detect a touch or proximate input at the one or more sensor nodes associated with touch icon 404.

In particular embodiments, when a sensor node associated with touch icon 404 of virtual alignment tool 400 is touched, an input may be determined according to a graphical indication provided by input icon 406. In particular embodiments, the input may be determined according to a location indicated by the input icon 406. For example, in the embodiment depicted, the input may be associated with a location corresponding to the location of the center 412 of input icon 406 of the virtual alignment tool 400. In other embodiments, the input may be associated with a location that is a predetermined distance in a predetermined direction from the location of input icon 406. In particular embodiments, the distance between the location of a detected touch and the location of entered input may be variable. In particular embodiments, this distance may be based on the location of a detected touch and the location of input icon 406. For example, substantially similar input (e.g., input at a location indicated by input icon 406) may be entered or otherwise effected in response to the detection of a touch at or substantially near any of multiple distinct locations associated with touch icon 406. The input may be any suitable input. As an example, the input may be a drawing unit, such as a mark or an erasure of a mark.

After the input is determined in response to the touch or proximate input, the input may be entered or otherwise effected. In particular embodiments, entering input may include storing the determined input on a computer readable medium. For example, a representation of a drawing mark may be stored in a memory of device 20. In particular embodiments, entering input may also include displaying the determined input. In particular embodiments, the input may be displayed at a location indicated by the input icon 406. For example, a drawing unit may be displayed at a location indicated by (e.g. the pencil tip of) input icon 406. In particular embodiments, the determined input may be displayed by a display of device 20.

In particular embodiments, if the object in contact with the touch icon 404 moves while maintaining contact with touch sensor 10 at one or more sensor nodes associated with touch icon 404, the virtual alignment tool 400 moves according to the movement of the object. For example, the virtual alignment tool 400 may move in the same direction as the movement of the object. As another example, the virtual alignment tool 400 may move a distance that is equivalent to or at least based on the distance that the object moves. In particular embodiments, as virtual alignment tool 400 moves from one location to another, input may be determined and entered each time a touch is detected at a distinct sensor node associated with touch icon 404. In particular embodiments, as virtual alignment tool 400 moves to a new location, a new set of sensor nodes may be associated with touch icon 404. For example, this set may include the sensor nodes that overlay the display of the touch icon 404 at its new location. As depicted in FIG. 4, three lines 410 have been drawn by virtual alignment tool 400 based on the movement of an object that maintains contact with touch sensor 10 at one or more sensor nodes associated with touch icon 404.

In particular embodiments, if the object loses contact with the touch sensor 10, the virtual alignment tool 400 may remain at the location at which the last touch was sensed. In particular embodiments, if an object contacts touch sensor 10 at a point outside of the touch icon 406 (or a point that is a sufficient distance from touch icon 406), the virtual alignment tool 400 may be moved to or near the point the object made contact with touch sensor 10 (but no input is entered). In another embodiment, virtual alignment tool 400 may be moved by contacting the touch screen 10 with object near the touch icon 406 and then moving the object in the desired direction while maintaining contact between the object and the touch screen 10.

Figure 5:
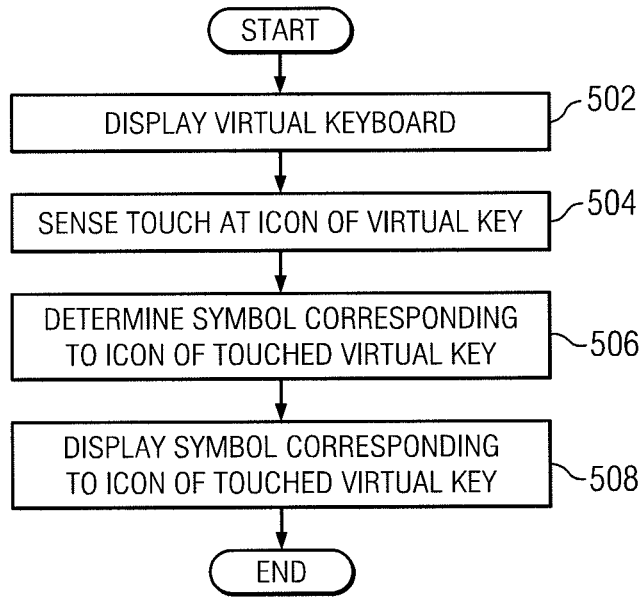
FIG. 5 illustrates an example method for displaying input received through a virtual keyboard.

FIG. 5 illustrates an example method for displaying input received through a virtual keyboard 200. The method begins at step 502 as virtual keyboard 200 is displayed. Virtual keyboard 202 may be displayed by a display panel of device 20. In particular embodiments, virtual keyboard 200 may overlay or be overlaid by a fixed touch screen. Virtual keyboard 200 may include any suitable virtual keys 202. In particular embodiments, one or more virtual keys 202 may each include one or more icons. For example, a virtual key 202 may include one or more touch icons 204 and one or more input icons 206.

At step 504, a touch is sensed at an icon of a virtual key 202. For example, a touch may be sensed at touch icon 204 of virtual key 202. The touch of the icon may be sensed in any suitable manner. For example, a touch may be sensed when a touch or proximate input is detected at a sensor node of touch screen 10 that is associated with touch icon 204. At step 506, a symbol corresponding to the icon of the touched virtual key 202 is determined. In particular embodiments, the symbol may be the same as a symbol displayed by the touched touch icon 204. In particular embodiments, the symbol may be the same as a symbol displayed by an input icon 206 associated with the touched touch icon 204. In particular embodiments, the symbol may be associated with the touched touch icon 204 in any other suitable manner. At step 506, the symbol determined in step 504 is displayed by touch screen 10. For example, the symbol may be displayed in display area 212 of device 20.

Figure 6:
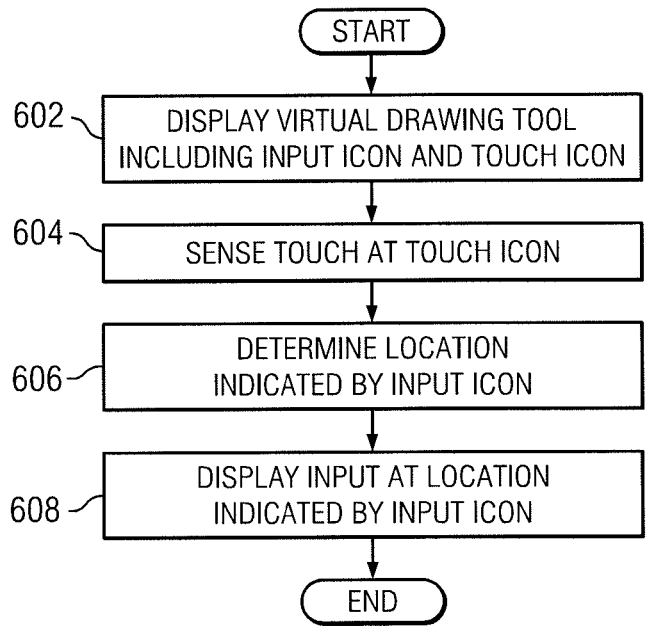
FIG. 6 illustrates an example method for displaying input received through a virtual drawing tool.

FIG. 6 illustrates an example method for displaying input received through a virtual drawing tool. The method begins at step 602 as a virtual drawing tool is displayed. In particular embodiments, the virtual drawing tool may be displayed by a display panel of device 20. The virtual drawing tool may be virtual pencil tool 300, virtual alignment tool 400, or other suitable drawing tool. The virtual drawing tool may include one or more input icons and one or more touch icons.

At step 604, a touch is sensed at the touch icon of the virtual drawing tool. The touch may be sensed in any suitable manner. For example, a touch may be sensed when a touch or proximate input is detected at a sensor node of touch screen 10 that is associated with the touch icon. In particular embodiments, the touch may be an initial touch, that is, an object that was previously not in contact with touch sensor 10 may touch the touch icon. In other embodiments, the touch may be a continuous touch, that is an object that was in contact with a point associated with the touch icon may be moved across touch sensor 10 to a new point associated with touch icon.

At step 606, a location indicated by an input icon of the virtual drawing tool may be determined. In particular embodiments, the location may correspond to the location of a portion of the input icon of the virtual drawing tool. In other embodiments, the location may be a location that is a predetermined distance in a predetermined direction from a portion of the input icon. At step 608, input is displayed at the location indicated by the input icon. For example, touch sensor 10 may display (or erase) a mark at the location indicated by the input icon.

A touch sensor input tool as described above may be implemented by any suitable logic. In particular embodiments, the logic used to implement a touch sensor input tool may be operable, when executed by a processor, to generate a graphical representation including the touch sensor input tool for a display. In particular embodiments, the logic may be operable to interact with touch sensor 10 and controller 12 to detect a touch or proximate input at a portion of touch sensor 10 associated with the touch sensor input tool (e.g. overlaying the touch sensor input tool). In particular embodiments, the logic may be operable to enter input associated with the touch sensor input tool. For example, the logic may cause the input to be stored in a computer readable medium. As another example, the logic may cause the input to be displayed by a display of a device. In particular embodiments, the logic may be operable to move touch sensor input tool according to one or more touches of touch screen 10. In particular embodiments, the logic may be operable to implement any of the operations (or any other appropriate operations) described herein with respect to touch sensor input tools.

A touch sensor input tool as described above may be implemented by any suitable type of touch screen. For example, a touch sensor input tool may be implemented by a capacitive touch screen, a resistive touch screen, an optical touch screen, a surface acoustic wave touch screen, or other suitable type of touch screen.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Particular embodiments may utilize a processor that includes hardware for executing instructions, such as those making up a computer program. As an example and not by way of limitation, to execute instructions, a processor may retrieve (or fetch) the instructions from an internal register, an internal cache, a memory, or storage; decode and execute them; and then write one or more results to an internal register, an internal cache, a memory, or storage. In particular embodiments, a processor may include one or more internal caches for data, instructions, or addresses. This disclosure contemplates a processor including any suitable number of any suitable internal caches, where appropriate. As an example and not by way of limitation, a processor may include one or more instruction caches, one or more data caches, and one or more translation lookaside buffers (TLBs). Instructions in the instruction caches may be copies of instructions in a memory or storage, and the instruction caches may speed up retrieval of those instructions by a processor. Data in the data caches may be copies of data in a memory or storage for instructions executing at a processor to operate on; the results of previous instructions executed at a processor for access by subsequent instructions executing at a processor or for writing to a memory or storage; or other suitable data. The data caches may speed up read or write operations by a processor. The TLBs may speed up virtual-address translation for a processor. In particular embodiments, a processor may include one or more internal registers for data, instructions, or addresses. This disclosure contemplates a processor including any suitable number of any suitable internal registers, where appropriate. Where appropriate, a processor may include one or more arithmetic logic units (ALUs); be a multi-core processor; or include one or more processors. Although this disclosure describes and illustrates a particular processor, this disclosure contemplates any suitable processor.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
    displaying by a computing device, a keyboard comprising a plurality of keys arranged in one or more rows, each key comprising a first touch icon associated with an alphanumeric character and a first input icon associated with the alphanumeric character such that each letter of the alphabet is represented on at least one key,
    wherein the first touch icon is visually separated from the first input icon such that the first touch icon is larger than the first input icon and is centered within the key, and the first input icon is anchored to a corner of the key such that it is viewable for the duration of a touch at or substantially near a location on a touch sensor associated with the first touch icon; and
    in response to the touch at or substantially near the location on the touch sensor associated with the first touch icon:
        determining by the computing device an input character based on the touch, the input character corresponding to the alphanumeric character of the first input icon; and
        effecting by the computing device the input character as determined.

2. The method of claim 1, wherein the location of the first touch icon in relation to the first input icon is predetermined.

3. The method of claim 1, wherein effecting the input character as determined comprises displaying the input character as determined.

4. The method of claim 1, wherein effecting the input character as determined comprises communicating the input character as determined for storage in a computer-readable medium with or without being displayed.

5. The method of claim 1, wherein effecting the input character as determined comprises communicating the input character as determined for it to be operated on with or without being displayed.

6. The method of claim 1, wherein:
    the first touch icon comprises a first symbol; and
    the first input icon comprises a second symbol.

7. The method of claim 6, wherein the first and second symbols are substantially similar to each other.

8. The method of Claim 7, wherein the first and second symbols are substantially similar to the alphanumeric character.

9. One or more computer-readable non-transitory storage media embodying logic that is configured when executed to:
    display a keyboard comprising a plurality of keys arranged in one or more rows, each key comprising a first touch icon associated with an alphanumeric character and a first input icon associated with the alphanumeric character such that each letter of the alphabet is represented on at least one key, wherein the first touch icon is visually separated from the first input icon such that the first touch icon is larger than the first input icon and is centered within the key, and the first input icon is anchored to a corner of the key such that it is viewable for the duration of a touch at or substantially near a location on a touch sensor associated with the first touch icon; and
    in response to the touch at or substantially near the location on the touch sensor associated with the first touch icon:
        determine an input character based on the touch, the input character corresponding to the alphanumeric character of the first input icon; and
        effect the input character as determined.

10. The media of claim 9, wherein the location of the first touch icon in relation to the first input icon is predetermined.

11. The media of claim 9, wherein effecting the input character as determined comprises displaying the input character as determined.

12. The media of claim 9, wherein effecting the input character as determined comprises communicating the input character as determined for storage in a computer-readable medium with or without being displayed.

13. The media of claim 9, wherein effecting the input character as determined comprises communicating the input character as determined for it to be operated on with or without being displayed.

14. The media of claim 9, wherein:
    the first touch icon comprises a first symbol; and
    the first input icon comprises a second symbol.

15. The media of claim 14, wherein the first and second symbols are substantially similar to each other.

16. The media of Claim 15, wherein the first and second symbols are substantially similar to the alphanumeric character.

17. A device comprising:
    a touch screen; and
    one or more computer-readable non-transitory storage media embodying logic that is configured when executed to:
        cause to be displayed on the touch screen, a keyboard comprising a plurality of keys arranged in one or more rows, each key comprising a first touch icon associated with an alphanumeric character and a first input icon associated with the alphanumeric character such that each letter of the alphabet is represented on at least one key,
        wherein the first touch icon is visually separated from the first input icon such that the first touch icon is larger than the first input icon and is centered within the key, and the first input icon is anchored to a corner of the key such that it is viewable for the duration of a touch at or substantially near a location on a touch sensor associated with the first touch icon; and
        in response to the touch at or substantially near the location on the touch sensor associated with the first touch icon:

determine an input character based on the touch, the input character corresponding to the alphanumeric character of the first input icon; and effect the input character as determined.

18. The device of claim 17, wherein the location of the first touch icon in relation to the first input icon is predetermined.

19. The device of claim 17, wherein:
the first touch icon comprises a first symbol; and
the first input icon comprises a second symbol.

20. The device of claim 17, wherein:
the first and second symbols are substantially similar to each other.

21. The device of claim 17, wherein the device is one or more of a desktop computer, a laptop computer, a tablet computer, a personal digital assistant (PDA), a smartphone, a satellite navigation device, a portable media player, a portable game console, a kiosk computer, or a point-of-sale device.

22. A method comprising:
displaying by a computing device, a virtual keyboard having a plurality of keys, each key comprising a keyboard touch icon representative of a character of a keyboard, and each key comprising a corresponding keyboard input icon representative of the same character of the keyboard as the corresponding keyboard touch icon, each keyboard touch icon being visually separated from the corresponding keyboard input icon such that the keyboard touch icon is larger than the keyboard input icon and is centered within the key, and the keyboard input icon is anchored to a corner of the key such that it is viewable for the duration of a touch at or substantially near a location on a touch sensor associated with the corresponding keyboard touch icon, and in response to a touch at or substantially near a location on a touch sensor associated with the keyboard touch icon:
determining by the computing device a keyboard character input based on the touch, the input corresponding to the character of the keyboard represented by the keyboard input icon corresponding to the at least one of the plurality of keyboard touch icons; and
effecting by the computing device the keyboard character input as determined.

\* \* \* \* \*